3,006,922
PRODUCTION OF HIGHLY CHLORINATED PHTHALOCYANINES EASILY DISPERSIBLE IN SPINNING MELTS
Georg Geiger, Binningen, Basel, Switzerland, assignor to Sandoz Ltd., Basel, Switzerland, a Swiss firm
No Drawing. Filed July 20, 1959, Ser. No. 828,063
Claims priority, application Switzerland Aug. 4, 1958
11 Claims. (Cl. 260—314.5)

It is known that synthetic fibers such as polyamide and polyester fibers which are spun from the melt can be dyed in that state by the addition of pigments before being spun. The pigments used must be stable at the high temperatures employed and must possess the property of homogeneous dispersion in the melted polymer. For this purpose the phthalocyanines have been found particularly suitable.

It has now been found that highly chlorinated copper phthalocyanines, preferably those containing 14 to 16 chlorine atoms, as well as mixtures of such phthalocyanines, can be obtained in a form having particularly good dispersibility in the melt when, after conversion into a finely divided form by precipitation from sulfuric acid or by another suitable operation, the pigments are heated at a temperature above 150° C., preferably at 200–250° C., in organic, preferably polar, solvents, subsequently freed from the solvents by filtration and washing, and finally dried. Should organic solvents with a boiling point below 200° C. be used, it is advisable to work in closed vessels under pressure.

This was not expected, for it is known that phthalocyanine pigments are readily converted by the action of organic solvents into crystalline forms which are of no value for dyeing purposes, this being especially the case when they are heated at a sufficiently high temperature.

When treated according to the new process, however, the highly chlorinated copper phthalocyanines not only show no visible coarsening of the crystal structure when viewed in the microscope but, surprisingly enough, are found to possess substantially better dispersibility in the melt than the untreated pigments.

Polar organic solvents with boiling points below 200° C. and those with high boiling points can be employed in the process. Those of high boiling point which are suitable include nitrobenzene, trichlorobenzene or a trichlorobenzene mixture, and 1- or 2-chloronaphthalene or its mixtures. If the process is carried out at a temperature below 200° C., dimethyl formamide is the preferred solvent.

The highly chlorinated and finely dispersible copper phthalocyanines are suitable for dyeing synthetic polyamide and polyester fibers as well as polypropylene in the melt. The shades of the resulting filaments, fibers or molded articles possess good fastness to light, washing, perspiration, water chlorine, crocking, heat setting and steam fixation.

In the following examples the parts and percentages are by weight and the temperatures in degrees centigrade.

*Example 1*

100 parts of hexadecachlorocopper phthalocyanine, produced according to, e.g., Swiss Patent 238,337 and precipitated from weakly fuming sulfuric acid, are added to 4500 parts of technical trichlorobenzene. The mixture is heated under reflux with stirring for 20 hours at 210–220° and subsequently cooled to 100°. The pigment is filtered off and washed with trichlorobenzene at 100° to free it of possible impurities. The trichlorobenzene is removed by washing the filter cake with alcohol, which in turn is removed by washing with water. The presscake is dried at 90–100°.

When the trichlorobenzene used in this example is replaced by nitrobenzene, 1- or 2-chloronaphthalene or a mixture of the latter, equally good results are obtained.

30 parts of the highly chlorinated, finely dispersible copper phthalocyanine thus obtained are mixed with 5000 parts of nylon 66 and melted in the normal way in a nitrogen atmosphere at about 285°. The thick liquid mass is spun to form a green-colored filament which has good fastness to light, chlorine and wet treatments. The filament can be orientated and/or bulked and preshrunk.

The pigment concentration in the polyamide melt can be reduced, for example from 0.6% to 0.1%, or increased to 2% without affecting the shade or the fastness to light, chlorine and wet treatments.

Perlon L (registered trademark) can be dyed in the same way, while Rilsan (registered trademark) is spun at 230°.

*Example 2*

100 parts of the highly chlorinated copper phthalocyanine, produced according to B.I.O.S. Final Report No. 960, p. 49 et seq. with an average chlorine content of 48.6% and subsequently precipitated from weakly fuming sulfuric acid, are run into 4000 parts of dimethylformamide. The suspension is heated in a closed autoclave for 20 hours at 200–210°, then allowed to cool to 100°. The pigment is filtered off and the presscake washed, first with dimethylformamide to eliminate any possible impurities, then with water to remove the residual dimethyl formamide, and finally dried at 90–100°.

25 parts of this pigment are mixed with 5000 parts of the condensate of terephthalic acid or its dimethyl ester and ethylene glycol, and the mixture melted by the normal method in a nitrogen atmosphere at about 280°. The thick liquid mass is spun to give a green filament of good fastness to light, chlorine and wet treatments. Polypropylene in the molten state can be dyed and spun in the same manner. The obtained filaments possess good fastness to light, chlorine and wet treatments.

Having thus disclosed the invention what I claim is:

1. A process for the preparation of highly chlorinated copper phthalocyanines which are easily dispersible in spinning melts, consisting essentially in heating finely dispersed highly chlorinated copper phthalocyanine in an organic solvent selected from the group consisting of dimethylformamide, trichlorobenzene, nitrobenzene, 1-chloro-naphthalene and 2-chloro-naphthalene, at a temperature of 150° C. to 250° C.

2. The process as described in claim 1, wherein the starting copper phthalocyanine has been converted previously into its finely dispersed form by precipitation from sulfuric acid.

3. The process as described in claim 1, wherein the starting copper phthalocyanine contains from 14 to 16 chlorine atoms.

4. The process as described in claim 1, wherein the heating step is carried out at a temperature between 150° and 200° C. under pressure.

5. A process for the preparation of highly chlorinated copper phthalocyanine which is easily dispersible in spinning melts, consisting essentially in heating finely dispersed highly chlorinated copper phthalocyanine in dimethyl formamide, at a temperature of 150° C. to 240° C.

6. A process for the preparation of highly chlorinated copper phthalocyanine which is easily dispersible in spinning melts, consisting essentially in heating finely dispersed highly chlorinated copper phthalocyanine in a trichlorobenzene, at a temperature of 150° C. to 250° C.

7. A process for the preparation of highly chlorinated copper phthalocyanine which is easily dispersible in spinning melts, consisting essentially in heating finely dispersed highly chlorinated copper phthalocyanine in a mixture of unsubstituted isomeric trichlorobenzenes, at a temperature of 150° C. to 250° C.

8. A process for the preparation of highly chlorinated copper phthalocyanine which is easily dispersible in spinning melts, consisting essentially in heating finely dispersed highly chlorinated copper phthalocyanine in nitrobenzene, at a temperature of 150° C. to 250° C.

9. A process for the preparation of highly chlorinated copper phthalocyanine which is easily dispersible in spinning melts, consisting essentially in heating finely dispersed highly chlorinated copper phthalocyanine in 1-chloro-naphthalene, at a temperature of 150° C. to 250° C.

10. A process for the preparation of highly chlorinated copper phthalocyanine which is easily dispersible in spinning melts, consisting essentially in heating finely dispersed highly chlorinated copper phthalocyanine in 2-chloro-naphthalene, at a temperature of 150° C. to 250° C.

11. A process for the preparation of highly chlorinated copper phthalocyanine which is easily dispersible in spinning melts, consisting essentially in heating finely dispersed highly chlorinated copper phthalocyanine in a mixture of 1-chloro- and 2-chloro-naphthalene, at a temperature of 150° C. to 250° C.

References Cited in the file of this patent

UNITED STATES PATENTS

| | | |
|---|---|---|
| 2,486,351 | Wiswall | Oct. 25, 1949 |
| 2,524,672 | Lecher et al. | Oct. 3, 1950 |